US009838463B2

(12) United States Patent
Cotter

(10) Patent No.: US 9,838,463 B2
(45) Date of Patent: Dec. 5, 2017

(54) SYSTEM AND METHOD FOR ENCODING CONTROL COMMANDS

(71) Applicant: Sony Interactive Entertainment America LLC, San Mateo, CA (US)

(72) Inventor: Timothy Cotter, Sunnyvale, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 209 days.

(21) Appl. No.: 13/797,427

(22) Filed: Mar. 12, 2013

(65) Prior Publication Data

US 2014/0280692 A1    Sep. 18, 2014

(51) Int. Cl.
*A63F 13/30*  (2014.01)
*H04L 29/08*  (2006.01)
*H04L 29/06*  (2006.01)
*H04L 1/00*   (2006.01)

(52) U.S. Cl.
CPC .............. *H04L 67/10* (2013.01); *A63F 13/30* (2014.09); *H04L 65/602* (2013.01); *H04L 67/125* (2013.01); *H04L 67/38* (2013.01); *H04L 1/0071* (2013.01)

(58) Field of Classification Search
CPC .... A63F 13/12; A63F 2300/403; A63F 13/30; H04L 1/0071
See application file for complete search history.

(56) References Cited

U.S. PATENT DOCUMENTS

| 6,219,730 | B1 * | 4/2001 | Nguyen | G06F 3/038 341/50 |
| 6,614,767 | B1 * | 9/2003 | Marko | H04L 1/0041 370/321 |
| 7,636,320 | B1 * | 12/2009 | Taylor | H04L 41/0631 370/229 |
| 7,969,985 | B1 | 6/2011 | Cline et al. | |
| 8,659,318 | B1 * | 2/2014 | Gordon | H03M 5/16 326/56 |
| 8,659,328 | B2 * | 2/2014 | Koenigsmann | H03K 17/691 327/108 |
| 2002/0155889 | A1 * | 10/2002 | Miyamoto | A63F 13/10 463/32 |
| 2003/0014569 | A1 * | 1/2003 | Kim | G06F 13/128 710/9 |
| 2007/0192663 | A1 * | 8/2007 | JiJina | H03M 13/35 714/752 |
| 2009/0006437 | A1 * | 1/2009 | Saito | H04N 19/61 |
| 2009/0285114 | A1 * | 11/2009 | Uchida | H04W 74/00 370/252 |
| 2009/0305789 | A1 * | 12/2009 | Patil | A63F 13/06 463/42 |

(Continued)

OTHER PUBLICATIONS

Notification of Transmittal of the International Search Report and the Written Opinion of the International Searching Authority, or the Declaration for International Application No. PCT/US2014/023794, dated Aug. 5, 2014, 9 pages.

*Primary Examiner* — Jeong S Park
(74) *Attorney, Agent, or Firm* — Martine Penilla Group, LLP

(57) ABSTRACT

A method comprising: packing commands comprising a plurality of data symbols into a data stream in a manner which allows the commands to be interpreted and executed at a receiver even when a sorting function is applied to sort the data symbols upon arrival at the receiver.

20 Claims, 11 Drawing Sheets

(56) References Cited

U.S. PATENT DOCUMENTS

| | | | |
|---|---|---|---|
| 2010/0113156 A1* | 5/2010 | Yen | A63F 13/02 |
| | | | 463/42 |
| 2011/0107220 A1 | 5/2011 | Perlman | |
| 2011/0241911 A1* | 10/2011 | Yang | H03M 13/3761 |
| | | | 341/52 |
| 2013/0012320 A1* | 1/2013 | Bellinghausen | A63F 13/10 |
| | | | 463/37 |
| 2013/0058392 A1 | 3/2013 | Wang et al. | |

* cited by examiner

| N | 41 |  |
|---|---|---|
| choose 6 | 4496388 |  |
| 2^22 | 4194304 |  |
|  |  |  |
| table | 5 |  |
| 0 | 0 | 0 |
| 1 | 658008 | 658008 |
| 2 | 575757 | 1233765 |
| 3 | 501942 | 1735707 |
| 4 | 435897 | 2171604 |
| 5 | 376992 | 2548596 |
| 6 | 324632 | 2873228 |
| 7 | 278256 | 3151484 |
| 8 | 237336 | 3388820 |
| 9 | 201376 | 3590196 |
| 10 | 169911 | 3760107 |
| 11 | 142506 | 3902613 |
| 12 | 118755 | 4021368 |
| 13 | 98280 | 4119648 |
| 14 | 80730 | 4200378 |
| 15 | 65780 | 4266158 |
| 16 | 53130 | 4319288 |
| 17 | 42504 | 4361792 |
| 18 | 33649 | 4395441 |
| 19 | 26334 | 4421775 |
| 20 | 20349 | 4442124 |
| 21 | 15504 | 4457628 |
| 22 | 11628 | 4469256 |
| 23 | 8568 | 4477824 |
| 24 | 6188 | 4484012 |
| 25 | 4368 | 4488380 |
| 26 | 3003 | 4491383 |
| 27 | 2002 | 4493385 |
| 28 | 1287 | 4494672 |
| 29 | 792 | 4495464 |
| 30 | 462 | 4495926 |
| 31 | 252 | 4496187 |
| 32 | 126 | 4496304 |
| 33 | 56 | 4496360 |
| 34 | 21 | 4496381 |
| 35 | 6 | 4496387 |
| 36 | 1 | 4496388 |

| example |  |
|---|---|
| N |  |
| unavailable | 0 |
| adjustment | 0 |
| target | 2222222 |
| index low |  |
| index high | 5 |
| value low | 2171604 |
| difference | 2548596 |
| status | good |
| relative sym | 4 |
| symbol | 4 |
|  |  |
| partition | 0 |
| symbol | 4 |
| base | 0 |
| table index | 4 |
| table low | 0 |
| table high | 2171604 |
| difference | 2171604 |
|  | 2171604 |
|  |  |
| sum | 2222222 |

*Fig. 6A*

| | | |
|---|---|---|
| table | 4 | |
| 0 | 0 | 0 |
| 1 | 82251 | 82251 |
| 2 | 73815 | 156066 |
| 3 | 66045 | 222111 |
| 4 | 58905 | 281016 |
| 5 | 52360 | 333376 |
| 6 | 46376 | 379752 |
| 7 | 40920 | 420672 |
| 8 | 35960 | 456632 |
| 9 | 31465 | 488097 |
| 10 | 27405 | 515502 |
| 11 | 23751 | 539253 |
| 12 | 20475 | 559728 |
| 13 | 17550 | 577278 |
| 14 | 14950 | 592228 |
| 15 | 12650 | 604878 |
| 16 | 10626 | 615504 |
| 17 | 8855 | 624359 |
| 18 | 7315 | 631674 |
| 19 | 5985 | 637659 |
| 20 | 4845 | 642504 |
| 21 | 3876 | 646380 |
| 22 | 3060 | 649440 |
| 23 | 2380 | 651820 |
| 24 | 1820 | 653640 |
| 25 | 1365 | 655005 |
| 26 | 1001 | 656006 |
| 27 | 715 | 656721 |
| 28 | 495 | 657216 |
| 29 | 330 | 657546 |
| 30 | 210 | 657756 |
| 31 | 126 | 657882 |
| 32 | 70 | 657952 |
| 33 | 35 | 657987 |
| 34 | 15 | 658002 |
| 35 | 5 | 658007 |
| 36 | 1 | 658008 |

| | |
|---|---|
| N | 50618 |
| unavailable | 4 |
| adjustment | 281016 |
| target | 331634 |
| index low | 4 |
| index high | 5 |
| value low | 281016 |
| difference | 333376 |
| status | good |
| relative sym | 0 |
| symbol | 5 |
| | |
| partition | 1 |
| symbol | 5 |
| base | 4 |
| table index | 4 |
| table low | 281016 |
| table high | 281016 |
| difference | 0 |
| | 0 |

*Fig. 6B*

| table | 3 | |
|---|---|---|
| 0 | 0 | 0 |
| 1 | 8436 | 8436 |
| 2 | 7770 | 16206 |
| 3 | 7140 | 23346 |
| 4 | 6545 | 29891 |
| 5 | 5984 | 35875 |
| 6 | 5456 | 41331 |
| 7 | 4960 | 46291 |
| 8 | 4495 | 50786 |
| 9 | 4060 | 54846 |
| 10 | 3654 | 58500 |
| 11 | 3278 | 61776 |
| 12 | 2925 | 64701 |
| 13 | 2600 | 67301 |
| 14 | 2300 | 69601 |
| 15 | 2024 | 71825 |
| 16 | 1771 | 73325 |
| 17 | 1540 | 74936 |
| 18 | 1330 | 76266 |
| 19 | 1140 | 77406 |
| 20 | 969 | 78375 |
| 21 | 816 | 79191 |
| 22 | 680 | 79871 |
| 23 | 560 | 80431 |
| 24 | 455 | 80886 |
| 25 | 364 | 81250 |
| 26 | 286 | 81536 |
| 27 | 220 | 81756 |
| 28 | 165 | 81921 |
| 29 | 120 | 82041 |
| 30 | 84 | 82125 |
| 31 | 56 | 82181 |
| 32 | 35 | 82216 |
| 33 | 20 | 82236 |
| 34 | 10 | 82246 |
| 35 | 4 | 82250 |
| 36 | 1 | 82251 |

| N | 50618 |
|---|---|
| unavailable | 4 |
| adjustment | 29891 |
| target | 80509 |
| index low | 23 |
| index high | 24 |
| value low | 80431 |
| difference | 80886 |
| status | good |
| relative sym | 19 |
| symbol | 25 |
| | |
| partition | 2 |
| symbol | 25 |
| base | 4 |
| table index | 23 |
| table low | 29891 |
| table high | 80431 |
| difference | 50540 |
| | 50540 |

*Fig. 6C*

| table | 2 | |
|---|---|---|
| 0 | 0 | 0 |
| 1 | 666 | 666 |
| 2 | 630 | 1296 |
| 3 | 595 | 1891 |
| 4 | 561 | 2452 |
| 5 | 528 | 2980 |
| 6 | 496 | 3476 |
| 7 | 465 | 3941 |
| 8 | 435 | 4376 |
| 9 | 406 | 4782 |
| 10 | 378 | 5160 |
| 11 | 351 | 5511 |
| 12 | 325 | 5836 |
| 13 | 300 | 6136 |
| 14 | 276 | 6412 |
| 15 | 253 | 6665 |
| 16 | 231 | 6896 |
| 17 | 210 | 7106 |
| 18 | 190 | 7296 |
| 19 | 171 | 7467 |
| 20 | 153 | 7620 |
| 21 | 136 | 7756 |
| 22 | 120 | 7876 |
| 23 | 105 | 7981 |
| 24 | 91 | 8072 |
| 25 | 78 | 8150 |
| 26 | 66 | 8216 |
| 27 | 55 | 8271 |
| 28 | 45 | 8316 |
| 29 | 36 | 8352 |
| 30 | 28 | 8380 |
| 31 | 21 | 8401 |
| 32 | 15 | 8416 |
| 33 | 10 | 8426 |
| 34 | 6 | 8432 |
| 35 | 3 | 8435 |
| 36 | 1 | 8436 |

| | |
|---|---|
| N | 78 |
| unavailable | 23 |
| adjustment | 7981 |
| target | 8059 |
| index low | ////// |
| index high | 24 |
| value low | 7981 |
| difference | 8072 |
| status | good |
| relative sym | 0 |
| symbol | 26 |
| partition | 3 |
| symbol | 26 |
| base | 23 |
| table index | 23 |
| table low | 7981 |
| table high | 7981 |
| difference | 0 |
| | 0 |

*Fig. 6D*

| table | 1 | |
|---|---|---|
| 0 | 0 | 0 |
| 1 | 36 | 36 |
| 2 | 35 | 71 |
| 3 | 34 | 105 |
| 4 | 33 | 138 |
| 5 | 32 | 170 |
| 6 | 31 | 201 |
| 7 | 30 | 231 |
| 8 | 29 | 260 |
| 9 | 28 | 288 |
| 10 | 27 | 315 |
| 11 | 26 | 341 |
| 12 | 25 | 366 |
| 13 | 24 | 390 |
| 14 | 23 | 413 |
| 15 | 22 | 435 |
| 16 | 21 | 456 |
| 17 | 20 | 476 |
| 18 | 19 | 495 |
| 19 | 18 | 513 |
| 20 | 17 | 530 |
| 21 | 16 | 546 |
| 22 | 15 | 561 |
| 23 | 14 | 575 |
| 24 | 13 | 588 |
| 25 | 12 | 600 |
| 26 | 11 | 611 |
| 27 | 10 | 621 |
| 28 | 9 | 630 |
| 29 | 8 | 638 |
| 30 | 7 | 645 |
| 31 | 6 | 651 |
| 32 | 5 | 656 |
| 33 | 4 | 660 |
| 34 | 3 | 663 |
| 35 | 2 | 665 |
| 36 | 1 | 666 |

| | |
|---|---|
| N | 78 |
| unavailable | 23 |
| adjustment | 575 |
| target | 653 |
| index low | 31 |
| index high | 32 |
| value low | 651 |
| difference | 656 |
| status | good |
| relative sym | 8 |
| symbol | 35 |
| | |
| partition | 4 |
| symbol | 35 |
| base | 23 |
| table index | 31 |
| table low | 575 |
| table high | 651 |
| difference | 76 |
| | 76 |

*Fig. 6E*

| table | 0 | |
|---|---|---|
| 0 | 0 | 0 |
| 1 | 1 | 1 |
| 2 | 1 | 2 |
| 3 | 1 | 3 |
| 4 | 1 | 4 |
| 5 | 1 | 5 |
| 6 | 1 | 6 |
| 7 | 1 | 7 |
| 8 | 1 | 8 |
| 9 | 1 | 9 |
| 10 | 1 | 10 |
| 11 | 1 | 11 |
| 12 | 1 | 12 |
| 13 | 1 | 13 |
| 14 | 1 | 14 |
| 15 | 1 | 15 |
| 16 | 1 | 16 |
| 17 | 1 | 17 |
| 18 | 1 | 18 |
| 19 | 1 | 19 |
| 20 | 1 | 20 |
| 21 | 1 | 21 |
| 22 | 1 | 22 |
| 23 | 1 | 23 |
| 24 | 1 | 24 |
| 25 | 1 | 25 |
| 26 | 1 | 26 |
| 27 | 1 | 27 |
| 28 | 1 | 28 |
| 29 | 1 | 29 |
| 30 | 1 | 30 |
| 31 | 1 | 31 |
| 32 | 1 | 32 |
| 33 | 1 | 33 |
| 34 | 1 | 34 |
| 35 | 1 | 35 |
| 36 | 1 | 36 |

| | |
|---|---|
| N | 2 |
| unavailable | 31 |
| adjustment | 31 |
| target | 33 |
| index low | 33 |
| index high | 34 |
| value low | 33 |
| difference | 34 |
| status | good |
| relative sym | 2 |
| symbol | 38 |
| | |
| partition | 5 |
| symbol | 38 |
| base | 31 |
| table index | 33 |
| table low | 31 |
| table high | 33 |
| difference | 2 |
| | 2 |

*Fig. 6F*

SYSTEM AND METHOD FOR ENCODING CONTROL COMMANDS

TECHNICAL FIELD

The present disclosure relates generally to the field of data processing systems and particularly to a system and method for encoding control commands.

BACKGROUND

Some current data processing devices such as the iPad provide for the connection of Bluetooth input devices such as keyboards, mice and microphones. However, support for devices is limited to those specified by the data processing device manufacturer. For example, Apple configures the iPad to recognize and accept a limited, specified set of Bluetooth input devices.

It would be beneficial to provide a mechanism for connecting input devices to data processing devices such as the iPad using the existing communication capabilities of these data processing devices.

BRIEF DESCRIPTION OF THE DRAWINGS

The present disclosure will be understood more fully from the detailed description that follows and from the accompanying drawings, which however, should not be taken to limit the disclosed subject matter to the specific embodiments shown, but are for explanation and understanding only.

FIGS. 6A-6F illustrates data for one specific example.

DESCRIPTION OF EXAMPLE EMBODIMENTS

In the following description specific details are set forth, such as device types, system configurations, communication methods, etc., in order to provide a thorough understanding of the present disclosure. However, persons having ordinary skill in the relevant arts will appreciate that these specific details may not be needed to practice the embodiments described.

The assignee of the present application has developed an online video gaming and application hosting system. Certain embodiments of this system are described, for example, in U.S. patent application Ser. No. 12/538,077, filed Aug. 7, 2009, entitled SYSTEM AND METHOD FOR ACCELERATED MACHINE SWITCHING (hereinafter '077 application) which claims priority to U.S. Provisional Application Ser. No. 61/210,888, filed, Mar. 23, 2009, and is a continuation-in-part (CIP) application of Ser. No. 10/315,460 filed Dec. 10, 2002 entitled, "APPARATUS AND METHOD FOR WIRELESS VIDEO GAMING", which is assigned to the assignee of the present CIP application. These applications are sometimes referred to as the "co-pending applications" and are incorporated herein by reference. A brief description of certain pertinent aspects of the online video game and application hosting system described in the co-pending applications will now be provided, following by a detailed description of a system and method for managing audio channels such as voice chat channels for computer games.

An Exemplary Online Video Game and Application Hosting System

Figure 1:
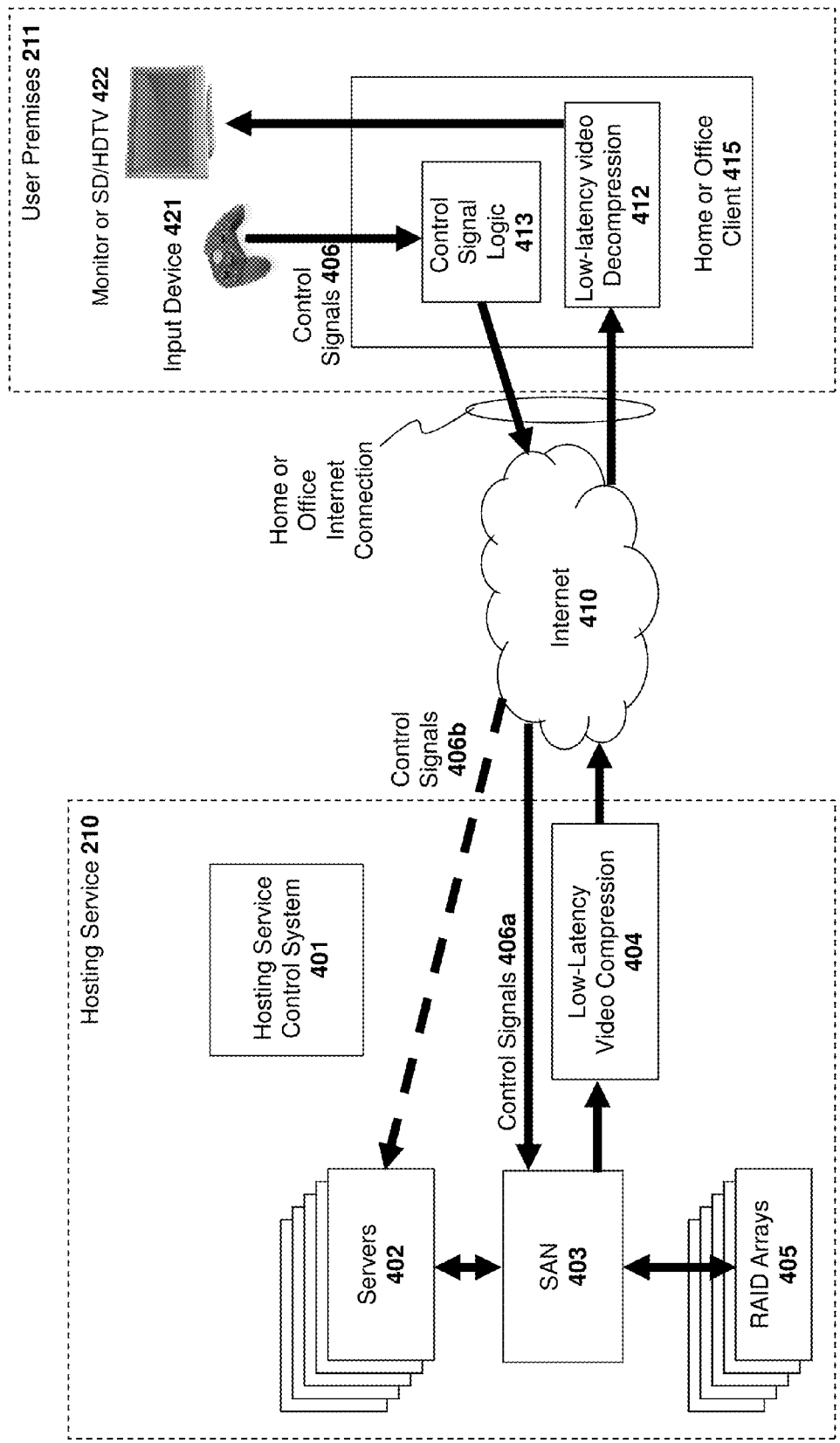
FIG. 1 illustrates a system architecture for executing online video games according to one embodiment of the invention.

FIG. 1 illustrates one embodiment of a video game/application Hosting Service 210 described in the co-pending applications. The Hosting Service 210 hosts applications running on Servers 402, that accept input from an Input device 421, received by Home or Office Client 415, and sent through the Internet 410 to Hosting Service 210. The Servers 402 are responsive to the input, and update their video and audio output accordingly which is compressed through Low-Latency Video Compression 404. The compressed video is then streamed through the Internet 410 to be decompressed by the Home or Office Client 415, and then displayed on Monitor or SD/HDTV 422. This system is an low-latency streaming interactive video system as more thoroughly described in the aforementioned "co-pending applications."

Figure 2:
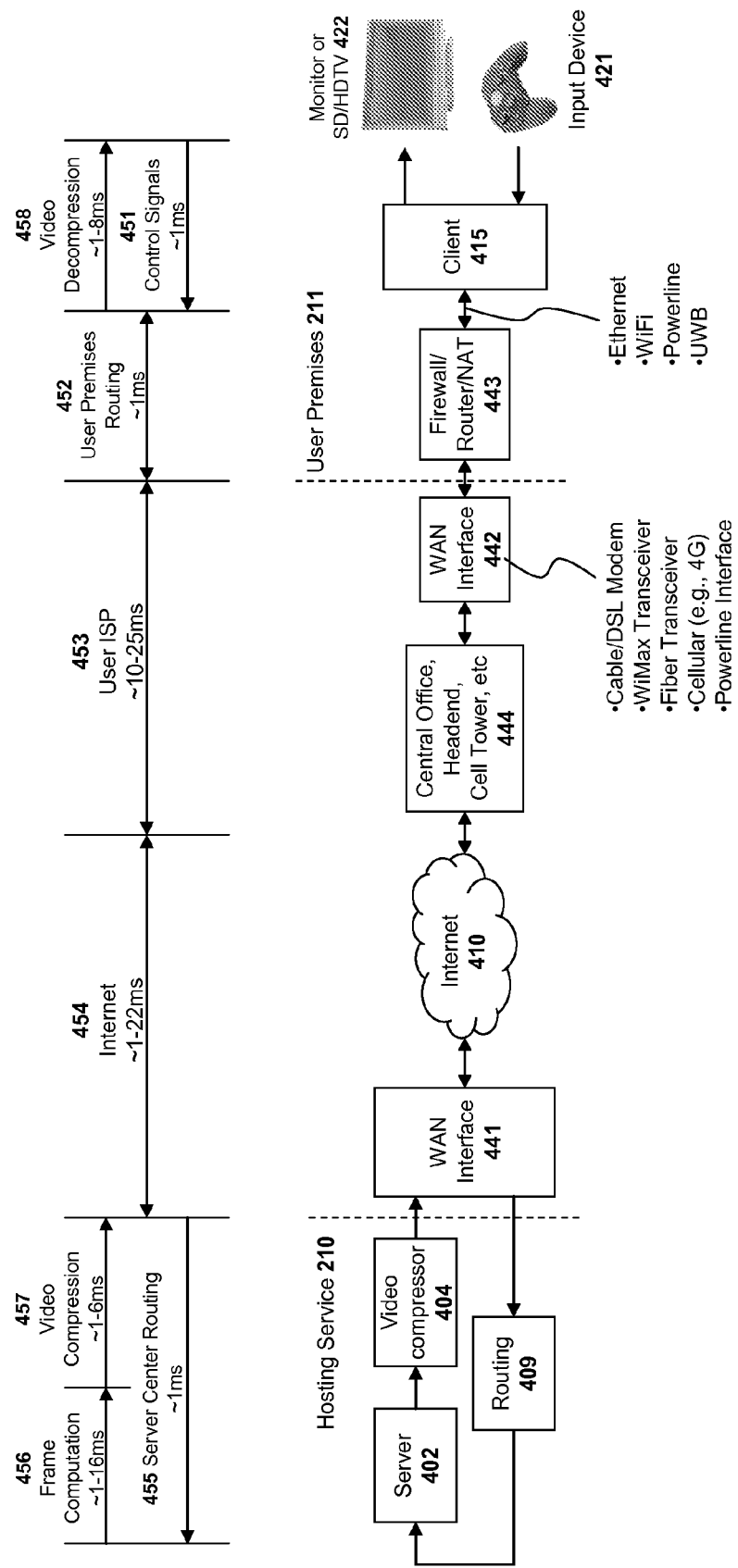
FIG. 2 illustrates different communication channels over which an online video game may be played in accordance with one embodiment of the invention.

As shown in FIG. 2, the network connection between the Hosting Service 210 Home and Office Client 415 may be implemented through a wide range of network technologies, of varying degrees of reliability, such as wired or optical fiber technologies that are typically more reliable and wireless technologies that may be subject to unpredictable interference or range limitations (e.g. Wi-Fi) and are typically less reliable. Any of these client devices may have their own user input devices (e.g., keyboards, buttons, touch screens, track pads or inertial sensors, position sensors, wands, video capture cameras and/or motion-tracking cameras, etc.), or they may use external input devices 421 (e.g., keyboards, mice, game controllers, inertial sensors, position sensor, wands, video capture cameras and/or motion tracking cameras, etc.), connected with wires or wirelessly. As described in greater detail below, the hosting service 210 includes servers of various levels of performance, including those with high-powered CPU/GPU processing capabilities. During playing of a game or use of an application on the hosting service 210, a home or office client device 415 receives control signals 406 from input device 421 from the user, and then it transmits the controller input through the Internet 410 to the hosting service 210 that executes the gaming program code in response and generates successive frames of video output (a sequence of video images) for the game or application software (e.g., if the user presses a button which would direct a character on the screen to move to the right, the game program would then create a sequence of video images showing the character moving to the right). This sequence of video images is then compressed using a low-latency video compressor, and the hosting service 210 then transmits the low-latency video stream through the Internet 410. The home or office client device then decodes the compressed video stream and renders the decompressed video images on a monitor or TV. Consequently, the computing and graphical hardware requirements of the client device 415 are significantly reduced. The client 415 only needs to have the processing power to forward the input device 421 control signals 406 through the Internet 410 and decode and decompress a compressed video stream received from the Internet 410, which virtually any personal computer is capable of doing today in software on its CPU (e.g., a Intel Corporation Core Duo CPU running at approximately 2 GHz is capable of decompressing 720p HDTV encoded using compressors such as H.264 and Windows Media VC9). And, in the case of any client devices, dedicated chips can also perform video decompression for such standards in real-time at far lower cost and with far less power consumption than a general-purpose CPU such as would be required for a modern PC. Notably, to perform the function of forwarding controller input and decompressing video, home client devices 415 do not require any specialized graphics processing units (GPUs), optical drive or hard drives.

As games and applications software become more complex and more photo-realistic, they will require higher-performance CPUs, GPUs, more RAM, and larger and faster disk drives, and the computing power at the hosting service 210 may be continually upgraded, but the end user will not be required to update the home or office client platform 415 since its processing requirements will remain constant for a display resolution and frame rate with a given video decompression algorithm. Thus, the hardware limitations and compatibility issues seen today do not exist in the system illustrated in FIG. 1.

Further, because the game and application software executes only in servers in the hosting service 210, there never is a copy of the game or application software (either in the form of physical optical media such as a DVD-ROM, or as downloaded software) in the user's home or office ("office" as used herein unless otherwise qualified shall include any non-residential setting, including, schoolrooms, for example). This significantly mitigates the likelihood of a game or application software being illegally copied (pirated), as well as mitigating the likelihood of a valuable database that might be use by a game or applications software being pirated. Indeed, if specialized servers are required (e.g., requiring very expensive, large or noisy equipment) to play the game or application software that are not practical for home or office use, then even if a pirated copy of the game or application software were obtained, it would not be operable in the home or office.

In one embodiment, the hosting service 210 provides software development tools to the game or application software developers (which refers generally to software development companies, game or movie studios, or game or applications software publishers) which design video games so that they may design games capable of being executed on the hosting service 210. Such tools allow developers to exploit features of the hosting service that would not normally be available in a standalone PC or game console (e.g., fast access to very large databases of complex geometry ("geometry" unless otherwise qualified shall be used herein to refer to polygons, textures, rigging, lighting, behaviors and other components and parameters that define 3D datasets)).

Different business models are possible under this architecture. Under one model, the hosting service 210 collects a subscription fee from the end user and pays a royalty to the developers. In an alternate implementation, the developers collect a subscription fee directly from the user and pays the hosting service 210 for hosting the game or application content. These underlying principles are not limited to any particular business model for providing online gaming or application hosting.

Figure 3:
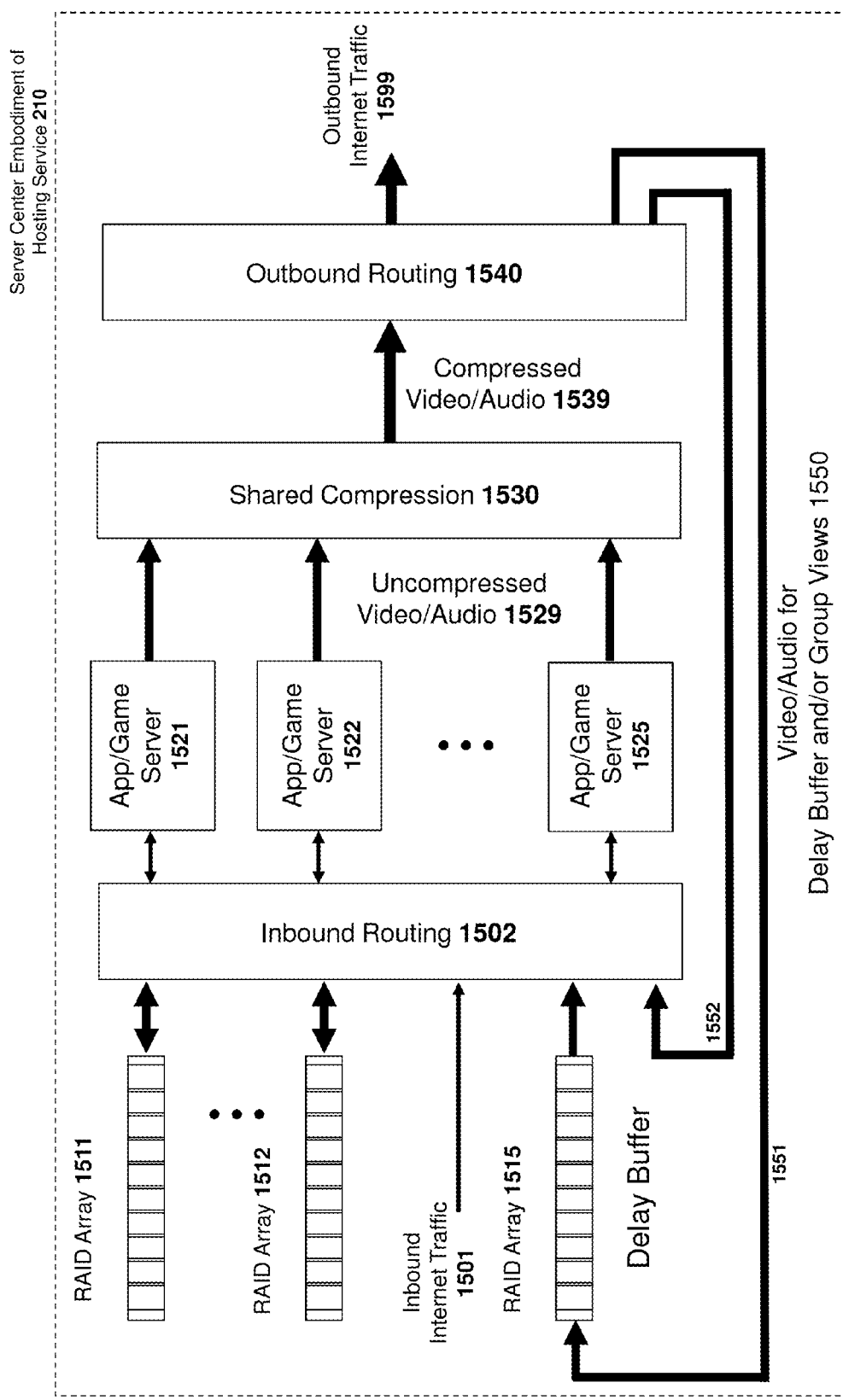
FIG. 3 illustrates one embodiment of a system architecture for compressing audio/video generated by a video game.

FIG. 3 illustrates an embodiment of components of a server center for hosting service 210 utilized in the following feature descriptions. Inbound internet traffic 1501 from user clients 415 is directed to inbound routing 1502. Typically, inbound internet traffic 1501 will enter the server center via a high-speed fiber optic connection to the Internet, but any network connection means of adequate bandwidth, reliability and low latency will suffice. Inbound routing 1502 is a system of network (the network can be implemented as an Ethernet network, a fiber channel network, or through any other transport means) switches and routing servers supporting the switches which takes the arriving packets and routes each packet to the appropriate application/game ("app/game") server 1521-1525. In one embodiment, a packet which is delivered to a particular app/game server represents a subset of the data received from the client and/or may be translated/changed by other components (e.g., networking components such as gateways and routers) within the data center. In some cases, packets will be routed to more than one server 1521-1525 at a time, for example, if a game or application is running on multiple servers at once in parallel. RAID arrays 1511-1512 are connected to the inbound routing network 1502, such that the app/game servers 1521-1525 can read and write to the RAID arrays 1511-1512. Further, a RAID array 1515 (which may be implemented as multiple RAID arrays) is also connected to the inbound routing 1502 and data from RAID array 1515 can be read from app/game servers 1521-1525. The inbound routing 1502 may be implemented in a wide range of prior art network architectures, including a tree structure of switches, with the inbound internet traffic 1501 at its root; in a mesh structure interconnecting all of the various devices; or as an interconnected series of subnets, with concentrated traffic amongst intercommunicating device segregated from concentrated traffic amongst other devices. One type of network configuration is a SAN which, although typically used for storage devices, it can also be used for general high-speed data transfer among devices. Also, the app/game servers 1521-1525 may each have multiple network connections to the inbound routing 1502. For example, a server 1521-1525 may have a network connection to a subnet attached to RAID Arrays 1511-1512 and another network connection to a subnet attached to other devices.

The app/game servers 1521-1525 may all be configured the same, some differently, or all differently, as previously described in relation to servers 402 in the embodiment illustrated in FIG. 1. In one embodiment, each user, when using the hosting service is typically using at least one app/game server 1521-1525. For the sake of simplicity of explanation, we shall assume a given user is using app/game server 1521, but multiple servers could be used by one user, and multiple users could share a single app/game server 1521-1525. The user's control input, sent from client 415 as previously described is received as inbound Internet traffic 1501, and is routed through inbound routing 1502 to app/game server 1521. App/game server 1521 uses the user's control input as control input to the game or application running on the server, and computes the next frame of video and the audio associated with it. App/game server 1521 then outputs the uncompressed video/audio 1529 to shared video compression 1530. App/game server may output the uncompressed video via any means, including one or more Gigabit Ethernet connections, but in one embodiment the video is output via a DVI connection and the audio and other compression and communication channel state information is output via a Universal Serial Bus (USB) connection.

The shared video compression 1530 compresses the uncompressed video and audio from the app/game servers 1521-1525. The compression may be implemented entirely in hardware, or in hardware running software. There may a dedicated compressor for each app/game server 1521-1525, or if the compressors are fast enough, a given compressor can be used to compress the video/audio from more than one app/game server 1521-1525. For example, at 60 fps a video frame time is 16.67 ms. If a compressor is able to compress a frame in 1 ms, then that compressor could be used to compress the video/audio from as many as 16 app/game servers 1521-1525 by taking input from one server after another, with the compressor saving the state of each video/audio compression process and switching context as it cycles amongst the video/audio streams from the servers. This results in substantial cost savings in compression hardware. Since different servers will be completing frames at different times, in one embodiment, the compressor resources are in a shared pool 1530 with shared storage means (e.g., RAM, Flash) for storing the state of each compression process, and when a server 1521-1525 frame is complete and ready to be compressed, a control means determines which compression resource is available at that time, provides the compression resource with the state of the server's compression process and the frame of uncompressed video/audio to compress.

Note that part of the state for each server's compression process includes information about the compression itself, such as the previous frame's decompressed frame buffer data which may be used as a reference for P tiles, the resolution of the video output; the quality of the compression; the tiling structure; the allocation of bits per tiles; the compression quality, the audio format (e.g., stereo, surround sound, Dolby® AC-3). But the compression process state also includes communication channel state information regarding the peak data rate and whether a previous frame is currently being output (and as result the current frame should be ignored), and potentially whether there are channel characteristics which should be considered in the compression, such as excessive packet loss, which affect decisions for the compression (e.g., in terms of the frequency of I tiles, etc). As the peak data rate or other channel characteristics change over time, as determined by an app/game server 1521-1525 supporting each user monitoring data sent from the client 415, the app/game server 1521-1525 sends the relevant information to the shared hardware compression 1530.

The shared hardware compression 1530 also packetizes the compressed video/audio using means such as those previously described, and if appropriate, applying FEC codes, duplicating certain data, or taking other steps to as to adequately ensure the ability of the video/audio data stream to be received by the client 415 and decompressed with as high a quality and reliability as feasible.

Some applications, such as those described below, require the video/audio output of a given app/game server 1521-1525 to be available at multiple resolutions (or in other multiple formats) simultaneously. If the app/game server 1521-1525 so notifies the shared hardware compression 1530 resource, then the uncompressed video audio 1529 of that app/game server 1521-1525 will be simultaneously compressed in different formats, different resolutions, and/or in different packet/error correction structures. In some cases, some compression resources can be shared amongst multiple compression processes compressing the same video/audio (e.g., in many compression algorithms, there is a step whereby the image is scaled to multiple sizes before applying compression. If different size images are required to be output, then this step can be used to serve several compression processes at once). In other cases, separate compression resources will be required for each format. In any case, the compressed video/audio 1539 of all of the various resolutions and formats required for a given app/game server 1521-1525 (be it one or many) will be output at once to outbound routing 1540. In one embodiment the output of the compressed video/audio 1539 is in UDP format, so it is a unidirectional stream of packets.

The outbound routing network 1540 comprises a series of routing servers and switches which direct each compressed video/audio stream to the intended user(s) or other destinations through outbound Internet traffic 1599 interface (which typically would connect to a fiber interface to the Internet) and/or back to the delay buffer 1515, and/or back to the inbound routing 1502, and/or out through a private network (not shown) for video distribution. Note that (as described below) the outbound routing 1540 may output a given video/audio stream to multiple destinations at once. In one embodiment this is implemented using Internet Protocol (IP) multicast in which a given UDP stream intended to be streamed to multiple destinations at once is broadcasted, and the broadcast is repeated by the routing servers and switches in the outbound routing 1540. The multiple destinations of the broadcast may be to multiple users' clients 415 via the Internet, to multiple app/game servers 1521-1525 via inbound routing 1502, and/or to one or more delay buffers 1515. Thus, the output of a given server 1521-1522 is compressed into one or multiple formats, and each compressed stream is directed to one or multiple destinations.

Further, in another embodiment, if multiple app/game servers 1521-1525 are used simultaneously by one user (e.g., in a parallel processing configuration to create the 3D output of a complex scene) and each server is producing part of the resulting image, the video output of multiple servers 1521-1525 can be combined by the shared hardware compression 1530 into a combined frame, and from that point forward it is handled as described above as if it came from a single app/game server 1521-1525.

Note that in one embodiment, a copy (in at least the resolution or higher of video viewed by the user) of all video generated by app/game servers 1521-1525 is recorded in delay buffer 1515 for at least some number of minutes (15 minutes in one embodiment). This allows each user to "rewind" the video from each session in order to review previous work or exploits (in the case of a game). Thus, in one embodiment, each compressed video/audio output 1539 stream being routed to a user client 415 is also being multicasted to a delay buffer 1515. When the video/audio is stored on a delay buffer 1515, a directory on the delay buffer 1515 provides a cross reference between the network address of the app/game server 1521-1525 that is the source of the delayed video/audio and the location on the delay buffer 1515 where the delayed video/audio can be found.

System and Method for Encoding Control Signals

One embodiment of the invention encodes control signals for an input device of a client using the existing communication capabilities of the client. Specifically, in one embodiment, an input device such as a game controller which is not natively supported by the client is connected to the client by mimicking an input device that is supported by the client (e.g., such as a keyboard). In the embodiments described below, a Bluetooth communication channel is used to connect the game controller to the client device. It should be noted, however, that the techniques described herein are not limited to Bluetooth and are not limited to a game controller input device.

Figure 4:
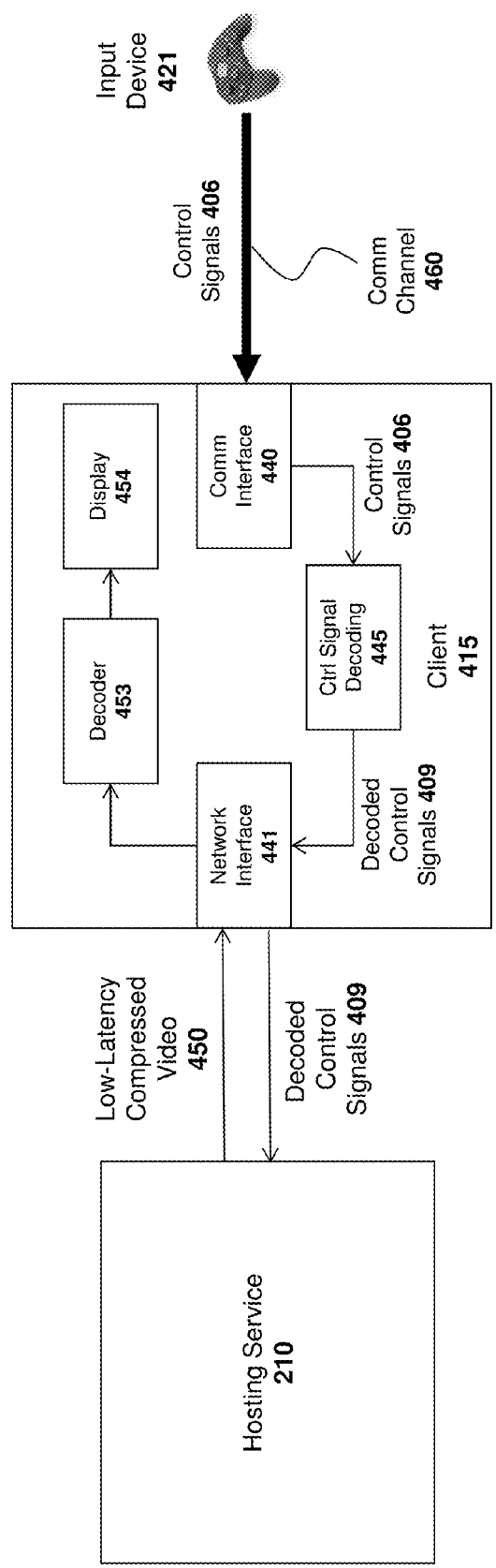
FIG. 4 illustrates a system architecture on which one embodiment of the invention may be implemented.

FIG. 4 illustrates one embodiment of the invention in which a game controller 421 is connected to a communication interface 440 such as a Bluetooth interface of a client 415 (e.g., an iPad). In one embodiment, the client 415 does not natively support the game controller 421 as an input device. Consequently, when pairing the input device 421 with the client 415, the input device 421 mimics an input device which is supported by the client 415 such as a keyboard. That is, the input device 421 communicates in a way which causes the client 415 to think that the input device 421 it is a keyboard (or other input device which is supported). Specifically, in one embodiment, the input device 421 packs control commands into packet control fields designated for the mimicked input device which the client 415 is capable of receiving and processing.

As illustrated generally in FIG. 4, the control signals 406 are received and decoded by control signal decoding logic 445 and the decoded control signals 409 are sent to the hosting service 210 via a network interface 441 such as an Ethernet or WiFi interface. Application or video game servers on the hosting service 210 then execute the video game or application in response to the control signals as previously described and the video generated by the application or video game is compressed and streamed to the client as low-latency compressed video 450. The compressed video 450 is received via the client's network interface 441, decoded by video decoder 453 and displayed on the device's display 454. It should be noted, however, that the underlying principles of the invention are not limited to an online application or video game hosting service 210.

As mentioned above, in one embodiment of the invention, the communication interface 440 is a Bluetooth interface and the game controller 421 (or other input device) pairs with the client 415 over a Bluetooth channel (using known Bluetooth pairing techniques but with the game controller mimicking another device type such as a keyboard). Using Bluetooth, it is possible to send 6 bytes at a time. However, not just any byte value can be sent. There are a limited number of legal symbols which may be transmitted over the Bluetooth interface (e.g., 75 out of 256 possible values). Moreover, in one embodiment, the client is natively configured to sort the symbols transmitted over the Bluetooth interface. For example, if the input device 421 transmits a set of symbols in the form FEDBCA, the communication interface 440 will inherently sort the symbols in order—ABCDEF.

In one embodiment, the game controller 421 needs to transmit 64 bits at a time (i.e., a single controller event, such as a button press requires 64 bits). To encode the 64 bits, one embodiment of the invention transmits 3 Bluetooth packets with 22 bits of control data each and encodes the set of allowable symbols to be a 22-bit number in a way which is immune to the sorting performed by the client 415. Said another way, the encoding scheme described herein squeezes 22 bits into multiple Bluetooth packets in a manner which is immune to reordering.

In one embodiment, the communication interface 440 is part of the operating system/driver layer on the client 415. It receives each of the 3 Bluetooth packets and sorts the symbols as described above. For example, if the symbols in a packet are transmitted as FECDBA, then the communication interface 440 sorts the symbols as ABCDEF and provides the sorted symbols to the control signal decoding logic 445 which decodes the sorted symbols and provides the decoded control signals 409 to the hosting service 210.

Figure 5:
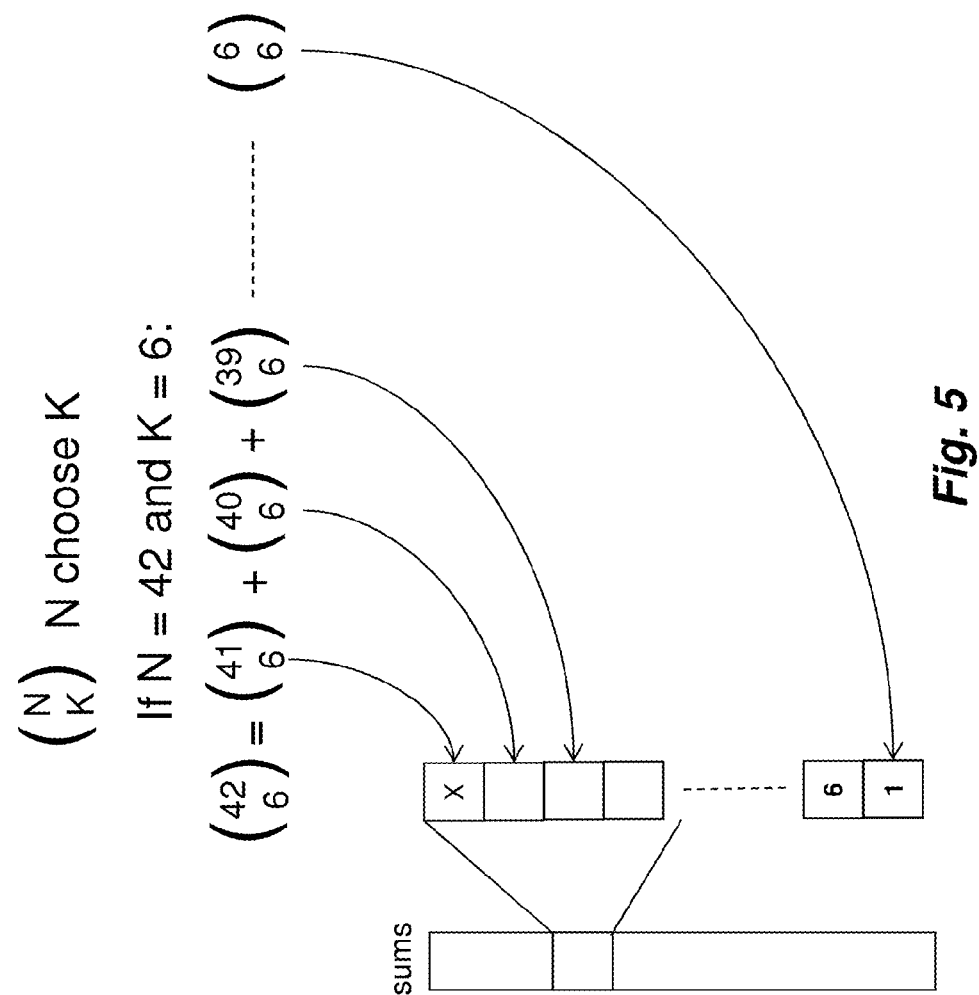
FIG. 5 illustrates a manner in which the symbols are chosen to represent the control data.

The specific manner in which the symbols are chosen to represent the control data (D) will now be described. In one embodiment, the number of data bits (B)=22, the size of the alphabet (N)=42, the number of symbols (K)=6. FIG. 5 illustrates one specific example. (1) Decrement N and K. (2) The smallest available symbol is selected for transmission if and only if D<(N choose K). (3) Otherwise, consider the next smallest symbol with (3a) D decremented by (N choose K) and (3b) decrement N. (4) Repeat (3) until a symbol is selected. (5) Repeat at (1) until all symbols are selected. In another embodiment, the algorithm may be optimized by precomputing the combinatorials (or sums of combinatorials) and storing them in tables. In other embodiments values, can be found efficiently in the tables using a sequential search, a binary search, or any other optimized method. FIGS. 6A-6F provides data for one specific example, but the underlying principles of the invention are not so limited.

In one embodiment, the various functional modules illustrated herein and the associated steps may be performed by specific hardware components that contain hardwired logic for performing the steps, such as an application-specific integrated circuit ("ASIC") or by any combination of programmed computer components and custom hardware components.

In one embodiment, the modules may be implemented on a programmable digital signal processor ("DSP") such as a Texas Instruments' TMS320x architecture (e.g., a TMS320C6000, TMS320C5000, . . . etc). Various different DSPs may be used while still complying with these underlying principles.

Embodiments may include various steps as set forth above. The steps may be embodied in machine-executable instructions which cause a general-purpose or special-purpose processor to perform certain steps. Various elements which are not relevant to these underlying principles such as computer memory, hard drive, and input devices have been left out of some or all of the figures to avoid obscuring the pertinent aspects.

Elements of the disclosed subject matter may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should also be understood that elements of the disclosed subject matter may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the disclosed subject matter may be downloaded as a computer program product, wherein the program may be transferred from a remote computer or electronic device to a requesting process by way of data signals embodied in a carrier wave or other propagation medium via a communication link (e.g., a modem or network connection).

Additionally, although the disclosed subject matter has been described in conjunction with specific embodiments, numerous modifications and alterations are well within the scope of the present disclosure. Accordingly, the specification and drawings are to be regarded in an illustrative rather than a restrictive sense.

What is claimed is:

1. A method, comprising:
receiving a set of control signals for a game at a game controller, the set of control signals corresponding to a set of input symbols, the set of control signals received at the game controller in a sequence that defines an input sequence of the set of input symbols, wherein the game controller is not a natively supported input device type for a client device;
encoding the set of input symbols into a code value that defines a sequentially ordered set of encoding symbols and that is decodable to reveal the input sequence of the set of input symbols; and
generating a data communication packet at the game controller, the data communication packet including one or more packet control fields having the code value present therein, the data communication packet formatted for processing by the client device in accordance with a communication protocol associated with at least one supported input device type for the client device; and
transmitting the data communication packet from the game controller to the client device over a communication channel, wherein the code value is extractable from the data communication packet in accordance with the communication protocol associated with the at least one supported input device type for the client device, and wherein the sequential ordering of encoding symbols of the code value prevents a reordering of the set of encoding symbols of the code value by the client device to enable decoding of the code value to obtain the input sequence of the set of input symbols.

2. The method as recited in claim 1, wherein the communication channel includes a Bluetooth connection.

3. The method as recited in claim 1, wherein the at least one natively supported input device type for the client device is a keyboard or a mouse.

4. The method as recited in claim 1, wherein the client device is a touch-screen computing device, a laptop computer, or a desktop computer.

5. The method as recited in claim 1, wherein encoding the set of input symbols into a code value includes partitioning a binomial coefficient value into a number of partitions equal to a number of symbols in the set of input symbols, the binomial coefficient value equal to a number of different ways of selecting the number of symbols in the set of input symbols from an available population of input symbols without regard to an ordering of selected symbols, and wherein encoding the set of input symbols into the code value includes mapping the input sequence of the set of input symbols across the number of partitions of the binomial coefficient value.

6. The method as recited in claim 1, wherein the client device is configured to decode the code value to obtain the input sequence of the set of input symbols.

7. A method, comprising:
receiving a first plurality of inputs for a game at a game controller, the first plurality of inputs received in a sequence that defines an input sequence of the first plurality of inputs, wherein the game controller is not a supported input device type for a client device;
encoding the first plurality of inputs into a code value that defines a second plurality of inputs, wherein the second plurality of inputs is ordered in a sequence that will avoid re-ordering of the second plurality of inputs when received at the client device;
generating a data communication packet at the game controller, the data communication packet including one or more packet control fields having the code value present therein, the data communication packet formatted for processing by the client device in accordance with a communication protocol associated with at least one supported input device type for the client device; and
transmitting the data communication packet from the game controller to the client device using the communication protocol associated with at least one supported input device type for the client device, wherein the code value is extractable from the data communication packet in accordance with the communication protocol associated with the at least one supported input device type for the client device, and wherein the sequence in which the second plurality of inputs is ordered prevents a reordering of the second plurality of inputs by the client device to enable decoding of the second plurality of inputs into the first plurality of inputs before forwarding the first plurality of inputs to a hosting service that hosts the game and executes the first plurality of inputs when generating a video for the game.

8. The method as recited in claim 7, wherein the at least one supported input device type is a keyboard or a mouse.

9. The method as recited in claim 7, wherein the communication protocol is a wireless communication protocol.

10. The method as recited in claim 9, wherein the wireless communication protocol is Bluetooth.

11. The method as recited in claim 7, wherein encoding the first plurality of inputs into the code value that defines the second plurality of inputs includes partitioning a binomial coefficient value into a number of partitions equal to a number of inputs in the first plurality of inputs, the binomial coefficient value equal to a number of different ways of selecting the first plurality of inputs from an available population of inputs without regard to an ordering of the first plurality of inputs.

12. The method as recited in claim 11, wherein encoding the first plurality of inputs into the code value that defines the second plurality of inputs includes mapping the input sequence of the first plurality of inputs across the number of partitions of the binomial coefficient value.

13. The method as recited in claim 7, wherein the client device is a touch-screen computing device, a laptop computer, or a desktop computer.

14. One or more computer readable media that are non-transitory and that store a program, wherein the program, when executed, instructs a processor to perform the following operations:
receiving a first plurality of inputs for a game at a game controller, the first plurality of inputs received in a sequence that defines an input sequence of the first plurality of inputs, wherein the game controller is not a supported input device type for a client device;
encoding the first plurality of inputs into a code value that defines a second plurality of inputs, wherein the second plurality of inputs is ordered in a sequence that will avoid re-ordering of the second plurality of inputs when received at the client device;
generating a data communication packet at the game controller, the data communication packet including one or more packet control fields having the code value present therein, the data communication packet formatted for processing by the client device in accordance with a communication protocol associated with at least one supported input device type for the client device; and transmitting the data communication packet from the game controller to the client device using the communication protocol associated with at least one supported input device type for the client device, wherein the code value is extractable from the data communication packet in accordance with the communication protocol associated with the at least one supported input device type for the client device, and wherein the sequence in which the second plurality of inputs is ordered prevents a reordering of the second plurality of inputs by the client device to enable decoding of the second plurality of inputs into the first plurality of inputs before forwarding the first plurality of inputs to a hosting service that hosts the game and executes the first plurality of inputs when generating a video for the game.

15. The computer readable media of claim 14, wherein the at least one supported input device type is a keyboard or a mouse.

16. The computer readable media of claim 14, wherein the communication protocol is a wireless communication protocol.

17. The computer readable media of claim 16, wherein the wireless communication protocol is Bluetooth.

18. The computer readable media of claim 14, wherein encoding the first plurality of inputs into the code value that defines the second plurality of inputs includes partitioning a binomial coefficient value into a number of partitions equal to a number of inputs in the first plurality of inputs, the binomial coefficient value equal to a number of different ways of selecting the first plurality of inputs from an available population of inputs without regard to an ordering of the first plurality of inputs.

19. The computer readable media of claim 18, wherein encoding the first plurality of inputs into the code value that defines the second plurality of inputs includes mapping the input sequence of the first plurality of inputs across the number of partitions of the binomial coefficient value.

20. The computer readable media of claim 14, wherein the client device is a touch-screen computing device, a laptop computer, or a desktop computer.

* * * * *